United States Patent [19]

O'Meara

[11] Patent Number: 4,874,223
[45] Date of Patent: Oct. 17, 1989

[54] OPTICAL NOTCH FILTER FOR DISCRIMINATING AGAINST COHERENT RADIATION

[75] Inventor: Thomas R. O'Meara, Malibu, Calif.

[73] Assignee: Hughes Aircraft Company, Los Angeles, Calif.

[21] Appl. No.: 312,428

[22] Filed: Feb. 17, 1989

Related U.S. Application Data

[63] Continuation of Ser. No. 83,410, Aug. 10, 1987, abandoned.

[51] Int. Cl.⁴ .................. G02B 27/00; G02F 1/33; G01J 3/45
[52] U.S. Cl. .................. 350/163; 350/358; 356/346; 356/352
[58] Field of Search .......... 350/162.11, 162.24, 350/163, 358; 356/73, 346, 352

[56] References Cited

U.S. PATENT DOCUMENTS

| | | | |
|---|---|---|---|
| 3,799,652 | 3/1974 | Torguet | 350/358 |
| 3,941,456 | 3/1976 | Schilz et al. | 350/358 |
| 4,309,108 | 1/1982 | Siebert | 356/352 |
| 4,443,066 | 4/1984 | Freyre | 350/358 |
| 4,624,566 | 11/1986 | Shifrin et al. | 356/73 X |
| 4,674,871 | 6/1987 | Shifrin | 356/73 |
| 4,682,888 | 7/1987 | Welner | 356/73 |
| 4,743,114 | 5/1988 | Crane, Jr. | 356/352 X |

FOREIGN PATENT DOCUMENTS

0162595A1 11/1985 European Pat. Off. .
2928205C2 6/1982 Fed. Rep. of Germany .
2138584A 10/1984 United Kingdom .

OTHER PUBLICATIONS

A. Yariv, "Introduction to Optical Electronics," 2nd Edition, Jun. 1976, pp. 340-352.

Primary Examiner—Bruce Y. Arnold
Assistant Examiner—David J. Edmondson
Attorney, Agent, or Firm—V. D. Duraiswamy; W. K. Denson-Low

[57] ABSTRACT

A self-tuning optical notch filter is employed to separate coherent from noncoherent radiation in an overall beam. The presence of coherent radiation is detected, preferably with an interferometer, and the frequency of the detected coherent radiation is determined. An electrical control signal is generated with a frequency corresponding to that of the coherent radiation, and causes an optical filter to filter out the coherent radiation from the beam. In the preferred embodiment the optical filter is a Bragg cell, and the electrical control signal is applied to an electro-acoustic transducer which furnishes an acoustic control signal to the Bragg cell.

20 Claims, 2 Drawing Sheets

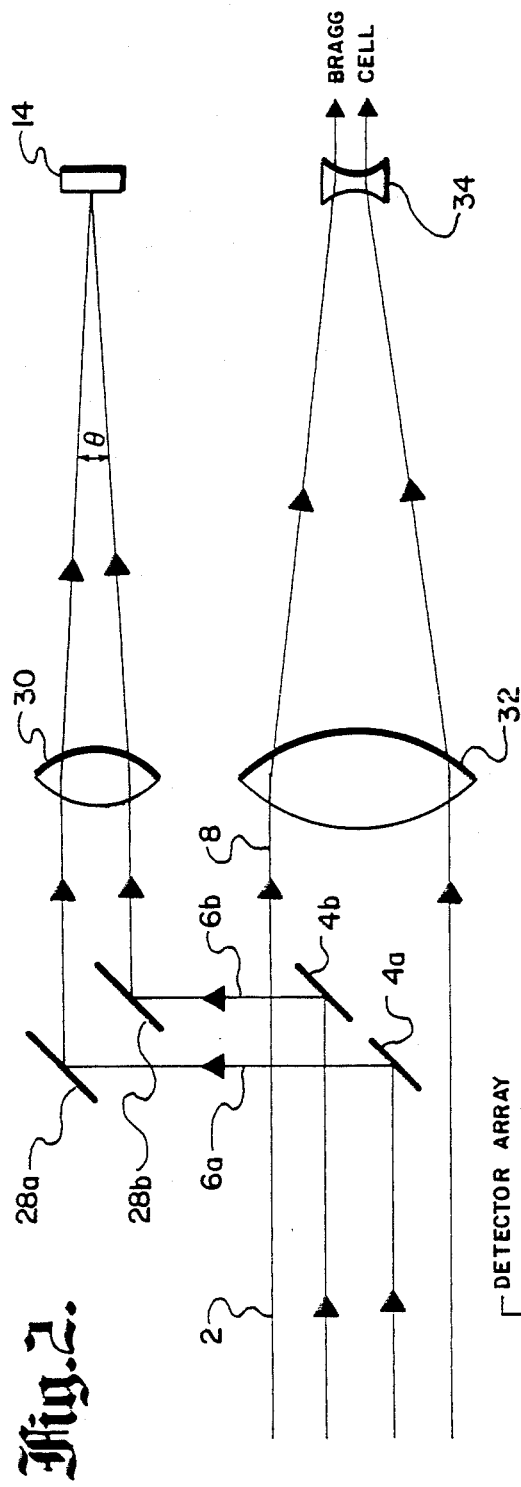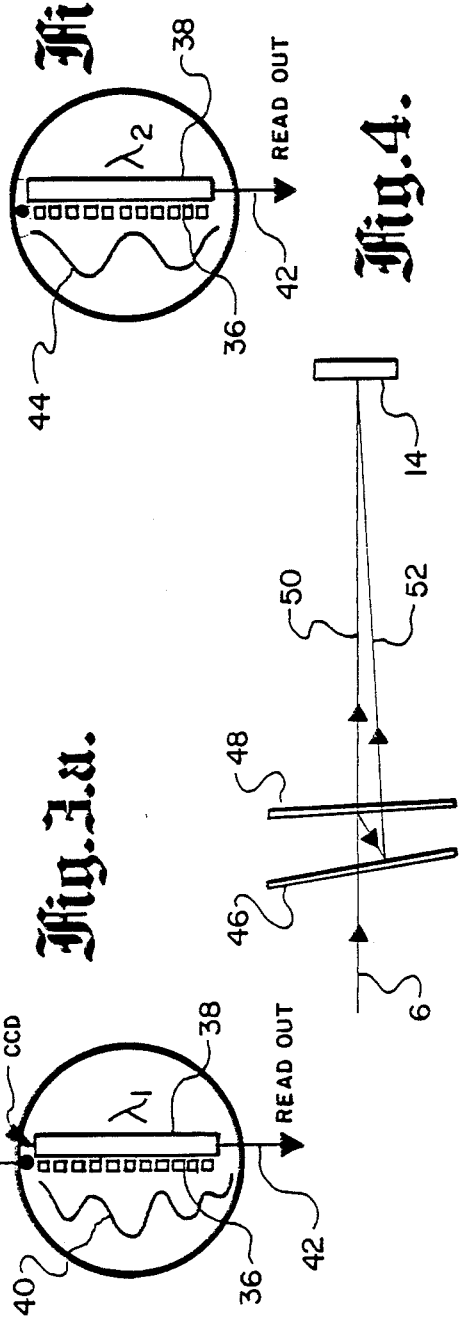

4,874,223

OPTICAL NOTCH FILTER FOR DISCRIMINATING AGAINST COHERENT RADIATION

This application is a continuation of application Ser. No. 083,410 filed Aug. 10, 1987, now abandoned.

BACKGROUND OF THE INVENTION

1. Field of the Invention

This invention relates to the processing of optical beams, and more particularly to optical notch filters used to discriminate against optical radiation at selected frequencies.

2. Description of the Related Art

Optical beams may be presented as a combination of coherent and noncoherent radiation, and it is sometimes desirable to remove the coherent components. When a light wave exhibits complete coherence, there is a predictable connection or correlation between the amplitude and phase at any one point in the beam and at any other point. In general, a cross-section of the beam will reveal a wave front, every portion of which is in-phase with every other portion. With noncoherent radiation, on the other hand, the frequency, phase and amplitude at any point in the beam is random with respect to other points.

Notch filters have been used in a variety of applications to remove signal components with a given frequency, or falling within a relatively narrow frequency band, from an overall signal. Notch filters have been developed for optical radiation uses, and have been employed to remove coherent radiation from a beam. However, presently available optical notch filters are passive devices in the sense that, while they may be tuned to different frequencies, once they are set their tuning remains fixed and they do not respond to dynamics within the beam. Thus, the filters will not respond if they are originally set to the frequency of the coherent radiation, but the frequency of the coherent radiation within the beam thereafter changes. Also, the coherent radiation frequency may be unknown, and the presence or absence of coherent radiation may itself also be unknown. In these situations present filters are ineffective.

SUMMARY OF THE INVENTION

In view of the above problems with the prior art, the object of the present invention is to provide a novel and improved notch filter and method for an optical beam which is capable of detecting the presence of coherent radiation within the beam, determining the frequency of the detected coherent radiation, and dynamically responding to remove the coherent radiation from the beam.

These objects are achieved by providing an optical filter that is adapted to discriminate against a selectable frequency, and positioning the filter to receive at least a portion of an input beam. Means are provided to detect the presence of coherent radiation in the beam, to determine its frequency, and to dynamically set the filter to discriminate against the coherent radiation, whereby the filter removes the coherent component of the beam and transmits the noncoherent components. In the preferred embodiment, a portion of the beam is diverted to an interferometer, which divides the diverted portion into two paths of unequal length and beats the paths against each other. The interferometer includes a mechanism for detecting any resulting interference fringe patterns, indicating the presence of coherent radiation. The fringe pattern is analyzed to determine the frequency of the coherent radiation, and a control signal is developed to dynamically set the filter to the coherent frequency.

The filter is preferably a Bragg cell which responds to an acoustic control signal. With this type of filter, an electrical control signal is generated which represents the detected frequency of the coherent radiation, and an electro-acoustic transducer operates in response to the electrical control signal to provide an acoustic control signal to the Bragg cell. The control signals respond dynamically to changes in the coherent component of the input beam, causing the Bragg cell to track the coherent radiation and continue filtering it despite any wavelength variations which may be introduced.

These and other features and objects of the invention will be apparent to those skilled in the art from the following detailed description of preferred embodiments, taken together with the accompanying drawings, in which:

DESCRIPTION OF THE DRAWINGS

FIG. 2 is a diagram of one form of interferometer that may be used to detect the presence of coherent radiation in the beam;

FIGS. 3a and 3b are representations of interference patterns formed by the interferometer in response to two different coherent radiation frequencies; and FIG. 4 is a diagram of an alternate form of interferometer that can be used with the dynamic filter of the present invention.

DETAILED DESCRIPTION OF PREFERRED EMBODIMENTS

Figure 1:
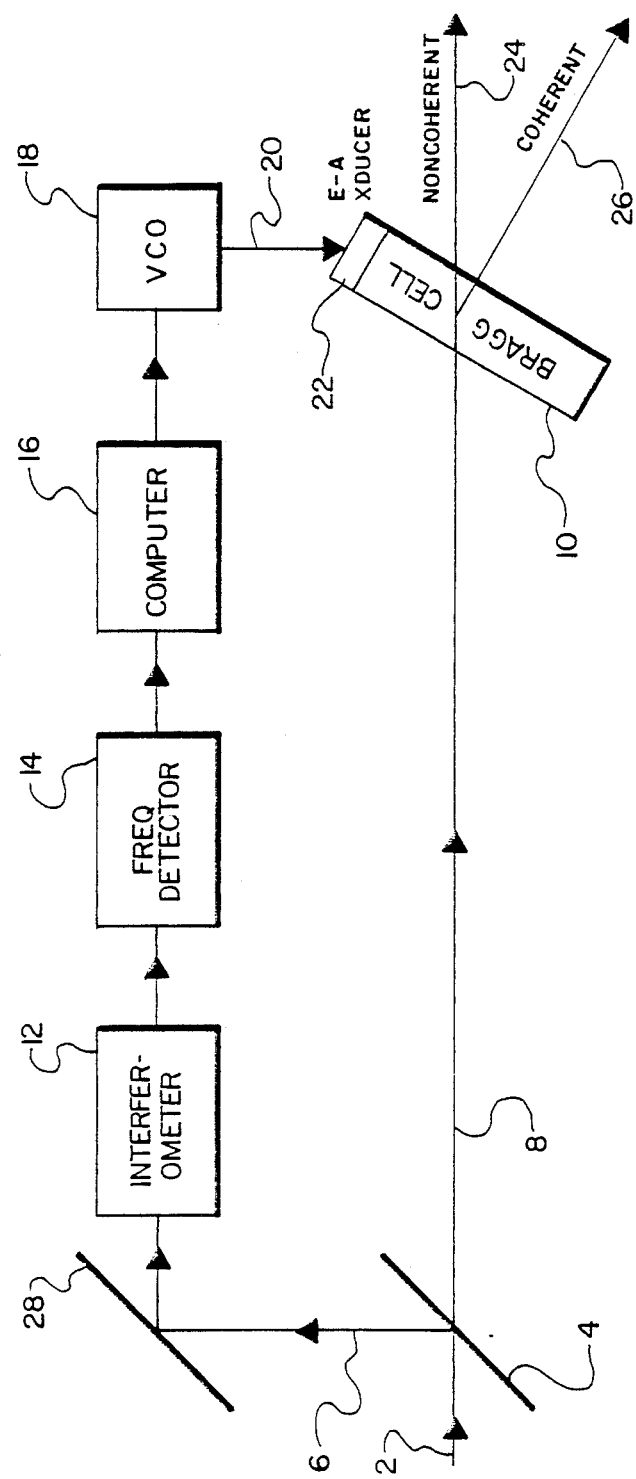
FIG. 1 is a block diagram of a system for removing coherent radiation from an input optical beam, constructed in accordance with the invention.

A preferred form of the invention is illustrated in FIG. 1. An input optical beam 2, which may have been transmitted through a receiving aperture (not shown), is directed onto a beam splitter 4, which may be provided as a partially silvered mirror. Beam 2 in general has non-coherent components and may also have coherent components; the system of FIG. 1 is structured to detect the coherent component, even though it may vary in frequency and be present only intermittently, and to remove it from the overall beam. For purposes of this application the term "optical" is intended in its broad sense to include not just visible light, but also infra-red radiation and other regions of the electromagnetic spectrum at which coherent beams may be transmitted.

The input beam is divided by beam splitter 4 into two resultant beams, one of the sub-beams 6 being directed to a coherency detection system. The other sub-beam 8 is directed to an optical filter 10, which removes coherent radiation from the beam in response to a control signal from the coherence detection system. Since the frequency of any coherent radiation is not known in advance, it is difficult to use an efficient dichroic beam splitter, and impossible to do so during transient start-up. Accordingly, beam splitter 4 is preferably implemented as a fixed wavelength independent splitter, which preferably gives most of the beam photons to the sub-beam 8 transmitted to filter 10.

The subsystem which detects coherent radiation within the input beam and provides a control signal to filter out such radiation consists of a coherency detector 12, preferably in the form of an interferometer, a frequency detector 14 which provides an indication of the frequency of any coherent radiation in the input beam, an analog or digital computer 16 which computes the frequency control policy for the filter 10 in response to the detected coherent frequency, and a frequency control circuit 18. The frequency control circuit 18 accepts the computer output and converts it to an electrical sinusoidal signal, on control line 20, having a frequency which corresponds to the detected coherent radiation frequency. The frequency control circuit 18 can be one or a series of VCOs or phase locked loops whose sinusoidal output signal is set to produce Bragg deflection at one or more estimated coherent radiation wavelength.

The optical filter 10 is, in one embodiment of the present invention, a Bragg cell. A Bragg cell is an acousto-optic cell which is both optically and acoustically transparent, and operates with moving diffraction gratings. An electroacoustic transducer 22 receives the electrical control signal on line 20 and converts it to an acoustic signal which propagates down the Bragg cell to set up its diffraction grating. With the Bragg cell set at a frequency corresponding to the detected coherent radiation frequency by the described control system, it deflects the portion of its input sub-beam 8 which is at the coherent radiation frequency, and transmits the remainder of the input beam. Thus, the noncoherent portion of the beam is transmitted through the cell to emerge as output beam 24, while the coherent radiation is filtered out of the main beam path as a deflected beam 26. Since the diffraction efficiency of a Bragg cell is limited, several cells may be operated in tandem to remove successively larger portions of the coherent radiation power.

Bragg cells are well known, and are described in text books, for example, "Introduction to Optical Electronics," A. Yariv, 2nd Edition, pp. 340-352. They are preferred because of their favorable diffraction efficiency. As an alternate to a Bragg cell, it might be possible to use a real time hologram. This is a device under development which deflects beams at different angles, according to their frequencies. It is not as useful in this application as a programmable coherent beam extractor, since it is a thin film device which exhibits poor diffraction efficiency.

With coherent radiation in the form of laser beams, the acoustic signal produced by electro-acoustic transducer 22 is typically in the range of about 10-40 MHz, depending upon the laser frequency and the angular orientation of the system. Thus, both the computer 16 and the voltage controlled oscillator circuit 18 must be capable of high speed operation.

The sub-beam 6 to be analyzed for coherent radiation is deflected off a mirror 28 into the interferometer 12. Numerous different interferometer designs may be used; one suitable design is shown in FIG. 2. In this design the beam splitter 4 and mirror 28 are integrated into the overall interferometer. Beam splitter 4 is implemented as a pair of small mirrors 4a and 4b within the periphery of input beam 2. They deflect respective minor portions of the input beam along parallel paths to respective mirrors 28a, 28b, from which the sub-beams are again reflected along new parallel paths to a focusing lens 30. The lens focuses the sub-beam to a common point at frequency detector 14, which is located at the focal length of the lens. The remainder of the input beam is transmitted as beam 8 to another lens 32, which partially focuses the beam to a collimating lens 34 and then to the Bragg cell.

The interferometer system shown in FIG. 2 is a "thinned-array" imaging system, in which the path lengths of the two sampled beams 6a and 6b are deliberately mismatched. If the path lengths are properly designed, any coherent components of the sampled beams will produce an interference fringe pattern at spatial frequency detector 14. The frequency of the coherent radiation can then be determined, based upon the fringe pattern.

The difference in the path lengths for the two sub-beams 6a and 6b must be between the coherence lengths for the anticipated coherent radiation, and the noncoherent radiation. For small path differentials, the fringe visibility for coherent radiation will remain high. As the differential increases, however, fringe visibility decreases until ultimately a path differential is reached at which the fringes disappear completely. This differential distance is defined as the coherence length of the radiation being analyzed. The coherence length for coherent laser radiation is much greater than that for a noncoherent broad band source, generally in the order of centimeters or meters for a laser as compared to microns for noncoherent light.

An implementation of the frequency detector 14 is shown in FIG. 3a. An optical detector array 36 is provided on a charge coupled device substrate 38. The spatial frequency is encoded on the detector as an amplitude distribution 40 corresponding to the wavelength of the coherent radiation. The sensed amplitude distribution is provided as a output from the frequency detector over line 42, generally as a temporal sequence, to the computer 16. The computer estimates one or more spatial period values Λ and one or more wavelength values λ via the relationship:

$$\lambda = \Lambda 2 \sin \theta / 2$$

where $\theta$ is the separation angle between the beams as illustrated in FIG. 2.

The amplitude distribution 44 for a different coherent radiation frequency is illustrated in FIG. 3b.

A second form of interferometer which may be used with the invention is a tilt plate shearing interferometer illustrated in FIG. 4. With this device a single sub-beam 6 is transmitted through a tilted one-way mirror 46 to a beam splitter 48. The planes of beam splitter 48 and one-way mirror 46 are angled to each other, such that a portion of the beam is transmitted through the beam splitter onto frequency detector 14 as a first sub-beam 50, while the remainder of beam 6 is re-directed back to the reflective side of one-way mirror 46, from whence it is reflected back through the beam splitter to frequency detector 14 as sub-beam 52. The two sub-beams 50 and 52 are close to parallel, with the spacing an angle between beam splitter 48 and one-way mirror 46 determining the required coherence length conditions. This system is appropriate for very short coherence length lasers, and has the advantage that alignment is easily maintained. Fringe contrast is somewhat lower than for the system of FIG. 2, but with a fringe contrast ratio of about 0.94 it is still sufficiently high.

The described system can be used to remove either one or a number of different coherent radiation frequencies from a received field, while passing incoherent radiation substantially without attenuation. Its response time will typically be limited by the signal/noise ratio of the detected coherent signal. The stronger the coherent signal, the faster is the system response, down to time responses in the order of microseconds. At this point, several individual component response times can typically limit the overall system response time. Unlike optical limiters, there is no requirement that the coherent signal intensity exceed that of the noncoherent source. Thus, the present system may be a natural complement to an optical limiter. The limiter could accept a very high intensity coherent source and limit its output to perhaps a factor of 10 or 100 times the noncoherent intensity. The present invention could then provide additional attenuation, bringing the coherent signal down to intensity levels comparable to or lower than the noncoherent signal level.

While particular embodiments of the invention have been shown and described, it should be understood that numerous variations and alternate embodiments will occur to those skilled in the art. Accordingly, it is intended that the invention be limited only in terms of the appended claims.

I claim:

1. An optical notch filter system, comprising:
   an optical filter adapted to discriminate against radiation at a selectable frequency,
   means for receiving an input optical radiation beam and transmitting at least a portion of the beam to the filter,
   electro-optic means responsive to the input beam for selecting a discrimination frequency, and
   means interfacing between the electro-optic means and the filter for setting the filter to discriminate against radiation at the frequency selected by the electro-optic means.

2. The system of claim 1, the filter comprising a Bragg cell.

3. The system of claim 2, the electro-optic means comprising means for establishing an electrical discrimination signal with a selected frequency, and the interface means comprising an electro-acoustic transducer adapted to provide an acoustic control signal to the Bragg cell in response to the electrical discrimination signal.

4. The system of claim 1, wherein the electro-optic means includes means for detecting the frequency of coherent radiation within the beam, and selects a discrimination frequency corresponding to the detected coherent radiation frequency.

5. The system of claim 1, wherein the receiving means comprises a beam splitter adapted to direct respective portions of an input optical beam to the filter and to the electro-optic means.

6. A system for filtering out coherent radiation from an input beam having coherent and noncoherent radiation components, comprising:
   an optical filter adapted to discriminate against a selectable frequency, and positioned to receive at least a portion of the beam,
   means for detecting the presence of coherent radiation in the beam,
   means for determining the frequency of the detected coherent radiation, and
   means for setting the filter to discriminate against the coherent radiation frequency so that the filter filters out radiation at the coherent radiation frequency from the received portion of the beam and transmits other radiation.

7. The system of claim 6, wherein the means for detecting the presence of coherent radiation comprises an interferometer.

8. The system of claim 7, wherein the interferometer is adapted to divide a portion of the beam into two paths of different lengths, and to thereafter bring the paths together to establish an interference fringe pattern for coherent radiation in the two paths, the difference in the path lengths being between the coherence lengths for coherent and noncoherent radiation.

9. The system of claim 7, including a beam splitter positioned to divide the beam between the filter and the interferometer.

10. The system of claim 6, the filter comprising a Bragg cell adapted to filter out radiation at the coherent radiation frequency from the input beam by deflecting such radiation out of the beam.

11. The system of claim 10, the filter setting means comprising means for establishing an electrical control signal representative of the frequency of the detected coherent radiation, and an electro-acoustic transducer adapted to provide an acoustic control signal to the Bragg cell in response to the electrical control signal.

12. A system for filtering out coherent radiation from an input beam having coherent and noncoherent radiation components, comprising:
   a Bragg cell,
   a beam splitter adapted to divide the input beam into two portions, one portion being directed to the Bragg cell,
   an interferometer positioned to receive the other portion of the beam, the interferometer dividing its portion of the beam into two different paths having different path lengths and beating the radiation in the two paths against each other to produce an interference fringe pattern for coherent radiation,
   means responsive to the interference fringe pattern for determining the frequency of the coherent radiation,
   means responsive to the frequency determining means for establishing an electrical control signal corresponding to the frequency of the coherent radiation, and
   an electro-acoustic transducer responsive to the electrical control signal to provide an acoustic control signal to the Bragg cell which causes the Bragg cell to deflect radiation at the detected frequency of the coherent radiation from the input beam.

13. The system of claim 12, including a plurality of Bragg cells positioned in series to receive the input beam, each Bragg cell being controlled by a similar acoustic control signal.

14. A method for removing coherent radiation from a beam having a combination of coherent and noncoherent radiation, comprising:
   segregating a portion of the beam,
   detecting the presence of coherent radiation in the segregated beam portion,
   determining the frequency of the detected coherent radiation,
   generating a control signal representative of the coherent radiation signal,
   applying the beam to a frequency sensitive filter, and
   controlling the filter with the control signal to remove radiation at the coherent radiation frequency from the beam.

15. The method of claim 14, wherein the presence of coherent radiation is detected by applying the segregated portion of the beam to an interferometer.

16. The method of claim 15, wherein the frequency of the detected coherent radiation is determined by analyzing the interference fringe pattern produced by the interferometer.

17. The method of claim 16, wherein the filter is a Bragg cell, the control signal is generated as an electrical signal which corresponds to the coherent frequency radiation, and the electrical control signal is transduced to an acoustic control signal for application to the Bragg cell.

18. An optical filter system, comprising:
an optical filter,
means for receiving an input optical radiation beam and transmitting at least a portion of the beam to the filter,
means for detecting the presence of a predetermined characteristic of the beam,
means for generating a control signal for application to said filter in response to the detection of said predetermined characteristic, said control signal operating upon said filter to modify said predetermined characteristic within the beam, and
means for applying the control signal to the filter.

19. The optical filter system of claim 18, wherein said predetermined beam characteristic comprises coherent radiation within the beam.

20. The optical filter system of claim 19, said optical filter comprising a notch filter, and said control signal operating upon said filter to substantially filter out the frequencies at which said coherent radiation is detected.

* * * * *